R. B. PARKS & JOHN R. PARKS.
Improvement in Stalk Cutters.
No. 123,641.  Patented Feb. 13, 1872.
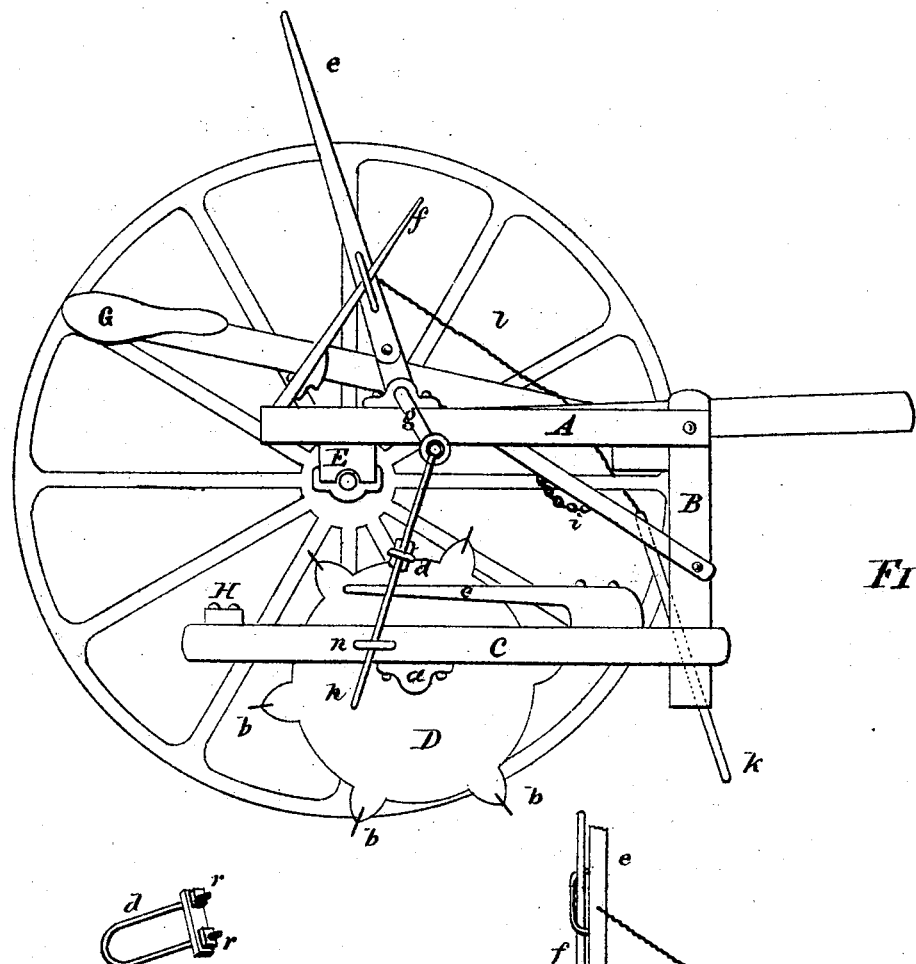
Fig. 1.
Fig. 3.
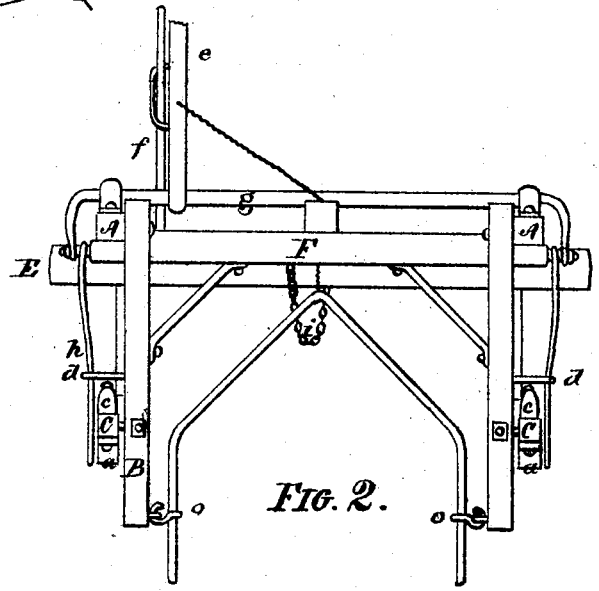
Fig. 2.
WITNESSES:
Henry O. Brown
O. W. Bond
Robert B. Parks
John R. Parks.
By West & Bond,
Their Atty's. INVENTORS.

UNITED STATES PATENT OFFICE.

ROBERT B. PARKS AND JOHN R. PARKS, OF PRINCETON, ILLINOIS.

IMPROVEMENT IN STALK-CUTTERS.

Specification forming part of Letters Patent No. 123,641, dated February 13, 1872.

SPECIFICATION.

We, ROBERT B. PARKS and JOHN R. PARKS, of the city of Princeton, in the county of Bureau and State of Illinois, have invented certain new and useful Improvements in Stalk-Cutters, of which the following is a full description, reference being had to the accompanying drawing making a part of this specification, in which—

Figure 1 is a side elevation with one wheel removed; Fig. 2, a front elevation of the frame with the wheels and cutters removed; Fig. 3, a detail of the stop.

In stalk-cutters of this class, where the blades are attached to a cylinder or roller drawn from the center, it is desirable to make the cylinder as light as possible, for the reason that the cutters strike the ground forward of the center of gravity and create a constant tendency to lift the cylinder; and where made light enough to have an easy draft the cutters are liable to pass over wet or heavy stalks without cutting them; and the nature of my invention consists in providing an intervening stop between the main frame and hinged frame, so as to limit the ascending motion of the hinged frame and bring the weight of the entire machine with that of the driver upon the cutters, and in providing an improved device for bringing the stalks into the proper position to be cut.

In the drawing, A E F constitute the main frame, hinged to the axle; B B, pendent bars attached to the front of the main frame; C H, a hinged or auxiliary frame, which is hinged to the pendant B, and which carries the cylinder containing the blades or cutters. b are the blades, secured to the cylinder D, which said cylinder is preferably made of two end sections made circular or with arms, and connected together by the axle and the blades or cutters. The journal-bearings of the cutter are at a. When not in use as a cutter, or in traveling, the lever or hinged frame is raised by means of the lever e and held by a lock on the bar f. The same movement that lifts the hinged frame also lifts the stop d and the rake k. The rake may, however, be lifted by a separate device. The lever e is secured to g, which is a rod crossing the machine and connected at the ends with the rods h, as shown. The ends of the rods h are bent under the beams C of the hinged frame so as to lift them; but by placing the stop d on frame A they may be made of chains, and be permanently connected with the beams C. Upon the upper side of each of the beams C we secure a spring-bar, c, and on each rod h we place a stop, d, which is adjustable on the rod h by means of the staple and nuts r. By this arrangement, when the cutters lift the lower frame beyond a certain point, determined by the stop d, the whole weight of the machine and driver is brought to bear upon the cutters, which weight forces them through any broom-corn stalks or other hard or wet stalks, and even cotton-stalks; and also gives springing or yielding motion, which improves the operation and relieves the machine from strain.

We can attain the same results by applying the spring to the stop and making the bar c rigid, or by placing the spring between the frames and lowering the stop so that it will come in contact with the beams C. We prefer the form shown, for the reason that it is more easily adjusted and applied.

The rake k is made of a single rod of iron, bent as shown at Fig. 2, and suspended from the upper frame by the chain i. The ends pass through the eyes o attached to the pendants B freely, so that the rake adapts itself to the surface of the ground under all circumstances. It is raised from the ground by means of the cord l attached to it and to the lever e, as shown, and the chain i prevents the upper end from tipping too far forward; but a slight incline in that direction improves its operation, which is to bring the stalks so far into line with the movement of the machine that the cutters will not pass over without chopping them.

We are aware that rakes or teeth have been applied to stalk-choppers to straighten the stalks; but in a short compact machine like ours the old hooks are inoperative.

We do not claim, broadly, the application of a rake or stalk-straightening device to a stalk-chopper. Neither do we now claim the arrangement of the upper main frame mounted on carrying-wheels with a hinged lower frame, as it is shown in a patent heretofore issued to us. Nor do we claim, broadly, any device by which the weight of the driver, in whole or in part, may be transferred from the main frame to the cutter; but

What we claim as new, and desire to secure by Letters Patent, is—

1. In a stalk-cutter, the removable stop $d$, located between the main frame A and frame C, and suitably connected to the lever-rod, in combination with the spring $c$, substantially as described.

2. The combination of the bar $c$, stop $d$, and rod $h$ with the upper frame A, lower frame C, shaft $g$, and lever $e$, substantially as specified.

ROBERT B. PARKS.
JOHN R. PARKS.

Witnesses:
H. H. FERRIS,
A. M. SWENGLE.